United States Patent [19]

Sasaki et al.

[11] Patent Number: 4,468,195
[45] Date of Patent: Aug. 28, 1984

[54] THERMAL TREATMENT APPARATUS

[75] Inventors: Tamotsu Sasaki, Ohme; Tetsuya Takagaki; Kenichi Ikeda, both of Kodaira, all of Japan

[73] Assignee: Hitachi, Ltd., Tokyo, Japan

[21] Appl. No.: 418,252

[22] Filed: Sep. 15, 1982

[30] Foreign Application Priority Data

Oct. 7, 1981 [JP] Japan ................................. 56-158822

[51] Int. Cl.³ ........................... F27B 1/26; F27D 3/00; B65G 25/00
[52] U.S. Cl. ...................................... 432/36; 198/774; 414/180; 432/239
[58] Field of Search .................. 432/36, 239; 414/152, 414/180; 198/448, 774

[56] References Cited

U.S. PATENT DOCUMENTS

| 3,710,757 | 1/1973 | Porter | 118/48 |
| 3,749,383 | 7/1973 | Voigt et al. | 266/512 |
| 4,008,815 | 2/1977 | Fisk | 414/180 |
| 4,075,972 | 2/1978 | Yamanaki et al. | 414/152 |

FOREIGN PATENT DOCUMENTS

| 323806 | 7/1975 | Austria . |
| 2327351 | 6/1972 | Fed. Rep. of Germany . |
| 117143 | 12/1975 | Fed. Rep. of Germany . |
| 2830589 | 1/1980 | Fed. Rep. of Germany . |

OTHER PUBLICATIONS

Camus, "Automatic Air-Tight Closing System for Diffusion Process Quartz Tube", IBM Disclosure Bull. vol. 24, No. 11B (Apr. 1982) pp. 6075–6076.
Benzing et al., Automation in CVD Wafer Processing, in *Solid State Technology* (Jan., 1975), pp. 39–42.
Franson, "Automating the Epitaxial Process", in *Electronics*, (Nov. 14, 1974), pp. 69–71.
Landis et al., "Automatic Diffusion Furnace System Using Microprocessor Control", in Solid State Technology (Jul., 1977), pp. 34–37.

*Primary Examiner*—John J. Camby
*Attorney, Agent, or Firm*—Antonelli, Terry & Wands

[57] ABSTRACT

The semiconductor device manufacturing process for producing semiconductors (transistor, IC, LSI or the like) needs a large number of thermal treatments for semiconductor wafers, such as thermal oxidation, diffusion, CVD, annealing or the like. The above-mentioned various thermal treatments are conducted by employing thermal treatment apparatus. The thermal treatment apparatus according to the present invention performs thermal treatments for semiconductor wafers, such as thermal oxidation, diffusion, CVD, annealing or the like, and has a soft landing loader capable of loading and unloading a wafer jig housing therein a plurality of semiconductor wafers into and from a process tube of the thermal treatment apparatus with high reliability and a high thermal efficiency as well as capable of automatic control of the movement of the semiconductor wafers in accordance with thermal treatment conditions.

13 Claims, 39 Drawing Figures

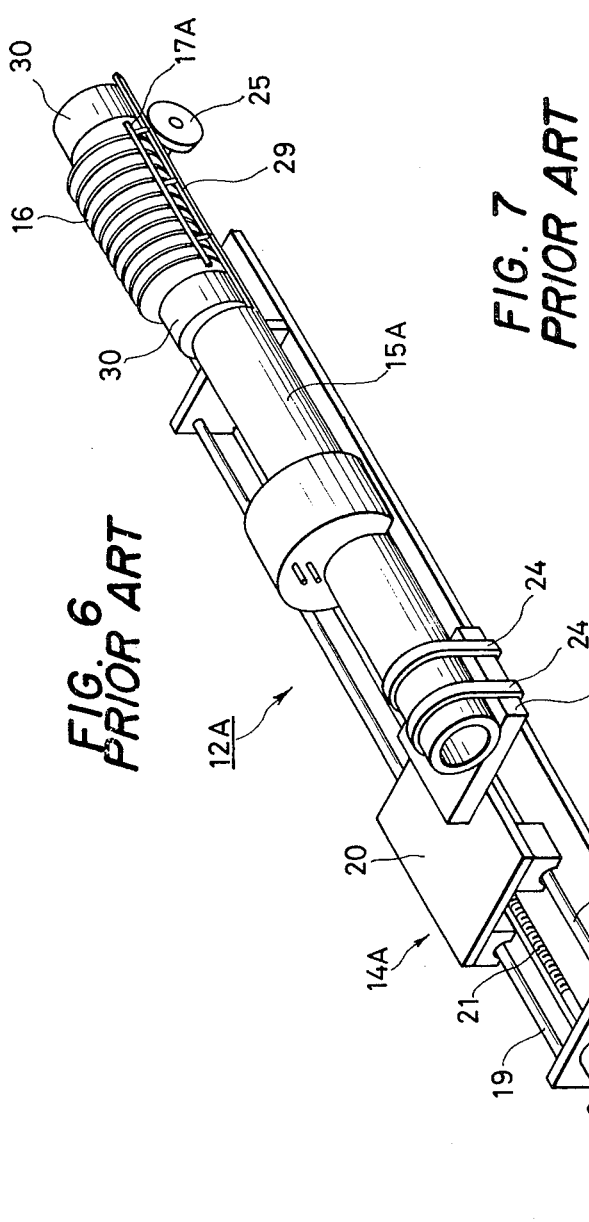
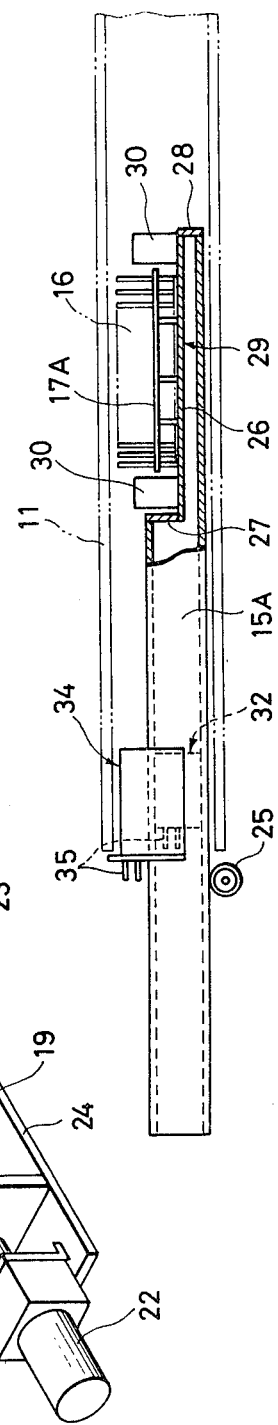
FIG. 6 PRIOR ART
FIG. 7 PRIOR ART

THERMAL TREATMENT APPARATUS

BACKGROUND OF THE INVENTION

The present invention relates to thermal treatment techniques for semiconductor wafers, such as thermal oxidation treatment, diffusion treatment, CVD(Chemical Vapor Deposition) treatment, annealing treatment and the like.

Since in a typical semiconductor manufacturing process, a thermal treatment furnace is employed for conducting thermal treatments for objects, e.g., wafers, to be treated, such as thermal oxidation, diffusion, CVD, annealing and the like, it is necessary to provide a boat (or susceptor) loading apparatus for taking wafers in and out of a process tube of the furnace. As apparatus of this kind, an apparatus according to the boat loader method and one according to the paddle method are conventionally employed. However, according to the boat loader method, there is such a disadvantage that when a wafer jig is moved in the process tube, dust is generated from the contact portion and may produce wafer defects. On the other hand, according to the paddle method, there is such a disadvantage that since thermal treatment is conducted while a paddle is being inserted in the process tube, a temperature change may arise in the furnace, so that any thermal treatment cannot be conducted under a constant temperature.

Moreover, various apparatus have been proposed besides the above-mentioned two kinds of apparatus. However, since all of them are arranged such that the wafer jig is not moved out of the furnace until completion of the thermal treatment once the wafer jig is set inside the furnace, or they are sequentially controlled, such a problem may arise in high-temperature treatments, particularly such as diffusion treatment that the wafer jig, which is made of quartz, fuses with the process tube, which is also made of quartz, and they are united together, causing the wafer jig to be unable to move out of the furnace. Therefore, there is a limitation on intent to make the furnace temperature much higher in case of employing the wafer jig. Although such an apparatus has been devised as using a quartz fork adapted to take in and out the wafer jig without any contact with the inner wall of the process tube, still the problem of the above-mentioned fusing between the wafer jig and the process tube cannot be solved. If the fork is made to support the wafer jig while being placed inside the process tube so as to be prevented from contacting the process tube, such a problem arises that the fork may be deformed due to a high temperature, so that it cannot support the wafer jig in a normal way.

What mentioned above will be described hereinunder in greater detail.

As disclosed in Japanese Patent Laid-Open No. 129964/1978, the conventional boat loader method is such that, as shown in FIG. 1, a wafer jig (or boat or susceptor) 2 mounted with semiconductor wafers 1 is loaded into or unloaded from a process tube 5 of a diffusion furnace 3 while contacting with the process tube 5 by hooking a loading and unloading rod 4, capable of reciprocation in the extension direction of the diffusion furnace 3, at an end of the wafer jig 2. According to the boat loader method, however, since the wafer jig 2 is loaded or unloaded while contacting with the process tube 5, they rub together and may cause the reactant powder attached to the inner wall of the process tube 5 to separate therefrom and attach to the surfaces of the semiconductor wafers 1. The attached substance may produce such defects as projections and pinholes in the films formed on the semiconductor wafers 1 through the thermal treatment, causing the characteristics of the thin films to be deteriorated as well as the production yield and reliability of semiconductor devices such as IC, LSI are lowered.

On the other hand, as disclosed in Japanese Patent Laid-Open No. 12996/1978, the paddle method is such that, as shown in FIG. 2, a roller 6b is provided at an end of a paddle (long rod) 6 having a wafer-receiving part 6a, and the paddle 6 mounted with the wafers 1 in the receiving part 6a is loaded into or unloaded from the process tube 5 of the diffusion furnace so as to move along the process tube 5. According to the paddle method, however, since a diffusion treatment is conducted while the paddle 6 is being loaded in the process tube 5, the heat inside the process tube 5 is taken by the paddle 6, causing a change in the temperature in the process tube 5, so that any diffusion treatment cannot be performed under a constant temperature, and moreover, since the process tube 5 and the roller 6b are under a contact state, dust is generated in the process tube 5 although the amount of the dust generated is smaller than that in the above-mentioned boat loader method.

Furthermore, as disclosed in Japanese Patent Laid-Open No. 36129/1981, such a thermal treatment apparatus as illustrated in FIG. 3 is conventionally employed when wafers are subjected to thermal treatment such as diffusion and oxidation. The apparatus generally comprises a boat transfer part 7, a gas discharge part 8, a furnace body 9 and a gas supply part 10. A plurality of process tubes 11 each having a horizontal axis are vertically disposed in the furnace body 9, and adapted to be heated to a desired temperature by means of a heater or the like, not shown. Moreover, the extended portion of each of the process tubes 11 is opened at the gas discharge part 8 so that a boat, described hereinafter, can be reciprocatively moved in and out of each the process tubes 11.

On the other hand, a boat loader 12 is disposed in the boat transfer part 7, corresponding to the extension line of each of the process tubes 11. Although, FIG. 3 illustrates only the uppermost boat loader, each boat loader 12 comprises: a boat driving part 14 having a portion projected from a driving mechanism, not shown but disposed in the cover of the boat transfer part 7, to the outside of the cover through a groove 13 and adapted to reciprocate in the axial direction of the corresponding process tube 11; and a boat 15 disposed along the axial extension line of the process tube and having the tail end attached to the boat driving part 14 so as to move in or out of the process tube in accordance with the movement of the boat driving part 14. Semiconductor wafers 16 to be subjected to a thermal treatment are held at the top end of the boat 15.

Treatment in the thermal treatment apparatus such as described above is conducted according to the following procedure: As shown in FIG. 4, after a mounting jig 17 for mounting semiconductor wafers is placed on the top end of the boat 15 and the semiconductor wafers 16 are held by the jig, the boat driving part 14 is actuated so that the boat 15 is entered into the process tube 11. When the boat 15 is entered to a given position, the whole or the top end of the boat 15 is slightly moved downward, thereby allowing the mounting jig 17 to be placed on the bottom surface inside the process tube.

Thereafter, the boat 15 is moved backward and drawn out of the process tube 11, thereby allowing only the mounting jig 11 and the semiconductor wafers 16 to be left inside the process tube, and then the opening of the process tube is capped to conduct, what is called, a thermal treatment. The semiconductor wafers having completed the thermal treatment are placed on the top end of the boat 15 entered into the process tube again, together with the jig 17, and unloaded from the process tube by drawing out the boat.

Accordingly, in the thermal treatment, it is necessary to move the boat 15 in and out of the process tube 11 twice in order to perform one thermal treatment, and moreover, there is a need for an operation to cap the opening of the process tube after the semiconductor wafers are set inside the process tube. Therefore, there are such problems that the time needed for the whole process of the thermal treatment becomes longer and it becomes difficult to automatize these operations in the process.

In addition, according to such a treatment method as described above wherein the semiconductor wafers 16 loaded in the process tube 11 are left therein together with the mounting jig 17, the jig 17 must be provided with support legs 18 which abut against the bottom surface inside the process tube when the boat 15 is slightly moved downward, as shown in FIG. 5 illustrating the sectional structures of the boat 15 and the jig 17 respectively, and moreover, each of the support legs 18 must be formed so that the lower end thereof is projected lower than the bottom surface of the boat 15. Consequently, the lower end of each of the support legs 18 easily interferes with the inner surface of the process tube 11 when the semiconductor wafers are loaded or unloaded, so that there are possibilities of damage to the support legs 18 and the inner surface of the process tube 11. If, especially, the inner surface of the process tube is damaged, cuttings may mix with a gas in the process tube and prevent the thermal treatment from being normally conducted. Therefore, it is conventionally necessary to design the inside diameter of the process tube to be sufficiently large, and this is an obstacle to miniaturization of such an apparatus as mentioned above wherein the process tubes each having a horizontal axis are vertically disposed.

Further, there is such another thermal treatment apparatus as described hereinunder, as disclosed in Japanese Patent Laid-Open No. 36129/1981.

FIG. 6 shows an arrangement of the essential part of the another conventional diffusion apparatus, i.e., an arrangement of a boat loader. Since each of a furnace body having process tubes, a gas discharge part and a gas supply part has the same arrangement as shown in FIG. 3, the description thereof is omitted. As shown in the figure, a boat driving part 14A of a boat loader 12A has a moving plate 20 capable of reciprocating on two guides 19 provided on a base 24 in the axial direction of the proces tube, the moving plate 20 being able to be reciprocated by rotating a feed screw 21 screwed into the moving plate 20 by means of a motor 22. In addition, a portion of the moving plate 20 is projected to the outside of a cover through a groove 14 formed in the cover, forming a boat securing plate 23 (see FIG. 3).

The tail end of a boat 15A formed into a substantially cylindrical shape is secured to the securing plate 23 by means of two belts 24, while the top end of the boat 15A is supported by means of a roller 25 provided on the process tube side so that the boat 15A can be moved in and out of the process tube in accordance with the movement of the securing plate 23. The boat 15A is formed from a heat-resisting member such as quartz, and as shown in FIG. 7 which illustrates the side configuration, a substantially upper half of the cylinder is cut at the top end portion, which is sealed by means of a bottom plate 26 and an end plate 27, thereby to form a mount 29. The mount 29 has baffles 30 provided at both ends and is adapted to be capble of placing a mounting jig 17A for mounting semiconductor wafers 16 between the baffles 30. It is to be noted also that the jig 17A is placed on the mount 29 while supporting the semiconductor wafers 16 fitted in the notches formed in parallel stems respectively and does not have such support legs as shown in FIG. 5.

On the other hand, a tubular inner cap 32 filled therein with a heat-insulating material 31 such as glass fiber or the like is received in the hollow inside the boat 15A at a substantially central portion thereof, precisely speaking, at such a portion that the boat 15A faces to the opening of the process tube 11, shown by imaginary lines in FIG. 7, when entering thereinto. Similarly, a substantial saddle-shaped outer cap 34 filled therein with a heat-insulating material 33 is fitted on the upper part of the outer periphery of the boat 15A. These inner and outer caps 32, 34 are adapted to close the opening of the process tube in cooperation with each other when the boat 15A enters into the process tube.

The operation of the above-mentioned apparatus will be described hereinunder.

After the mounting jig 17A is placed on the mount 29 at the top end of the boat 15A and moreover the semiconductor wafers 16 are mounted thereon, the motor 22 is driven. Consequently, the feed screw 21 allows the moving plate 20 and the securing plate 23 to move toward the process tube 11 along the guides 19, causing the boat 15A to enter into the process tube from its top end. While being supported by the roller 25, the boat 15A is entered into the process tube 11 along the slightly lower side thereof. Stopping the boat 15A when the semiconductor wafers 16 are inserted to a given position allows the inner and outer caps 32, 34 having just moved to the position of the opening of the process tube to close the opening in cooperation with each other. Thereby, if the process tube is heated under this condition and moreover a thermal treatment is conducted while a gas is being supplied according to circumstances, it is possible to perform the thermal treatment while the inside of the process tube is kept under a thermally sealed state. On completion of the thermal treatment, the boat 15A is drawn out of the process tube and the semiconductor wafers 16, together with the jig 17A, are brought down from the boat, and semiconductor wafers to be subsequently treated are placed together with the jig, thereby to make it possible to conduct the subsequent thermal treatment in a similar manner to that described above.

However, in each of the apparatus shown in FIG. 3 through FIG. 5 and FIG. 6 thru FIG. 7, since the wafer jig is loaded or unloaded while the jig and the process tube are contacting with each other, they rub together and may cause the reactant powder attached to the inner wall of the process tube to separate therefrom and attach to the surfaces of the semiconductor wafers. The attached substance may produce defects such as projections and pinholes in the films formed on the semiconductor wafers by means of the thermal treatment, so that the thin film characteristics are deteriorated and the production yield and reliability of semiconductor devices such as IC, LSI or the like are lowered.

Moreover, there is such a disadvantage that since the process tube and the roller are contacted with each other, dust may be generated inside the process tube and curled up.

SUMMARY OF THE INVENTION

It is, therefore, an object of the present invention to arrange a fork, capable of supporting the wafer jig at its end, so that the fork can be taken in and out of the process tube without contacting with the inner surface of the process tube of the thermal treatment furnace.

Another object of the present invention is to enable the wafer jig to be moved up and down by vertically swinging the end of the fork.

A still another object of the present invention is to arrange such that the stop position of the fork inside and outside the process tube is set at will and the movement of the fork can be sequentially controlled.

A further object of the present invention is to provide a thermal treatment method and a thermal treatment apparatus employed therein, by which generation of dust can be prevented and a thermal treatment under a constant temperature can be realized and moreover a thermal treatment can be conducted under high-temperature conditions without deformation of the fork due to heat as well as fusing of the wafer jig with the process tube.

The present invention can best be understood by reference to the following description taken in connection with the accompanying illustrative drawings.

BRIEF DESCRIPTION OF THE DRAWINGS

FIG. 6 is a perspective view of a still another conventional thermal treatment apparatus;

FIG. 7 is a side view of the thermal treatment apparatus shown in FIG. 6;

FIG. 11 thru FIG. 13(A), FIG. 13(B) and FIG. 13(C) illustrate the soft landing loader according to the present invention respectively;

DESCRIPTION OF THE PREFERRED EMBODIMENT

The present invention will be described in detail in the following in connection with a preferred embodiment thereof.

Figure 1:
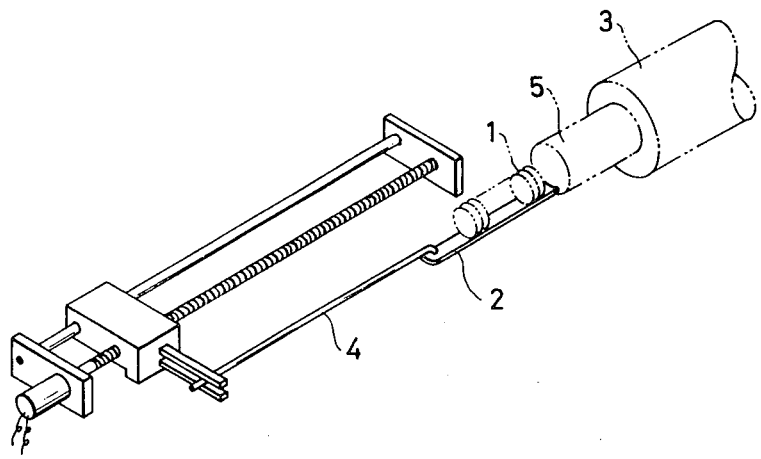
FIG. 1 is a schematic perspective view of a thermal treatment furnace according to the conventional boat loader method.
Figure 2:
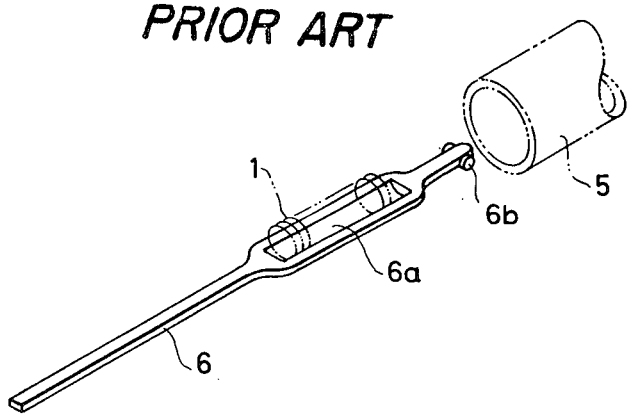
FIG. 2 is a schematic perspective view of a thermal treatment furnace according to the conventional paddle method.
Figure 3:
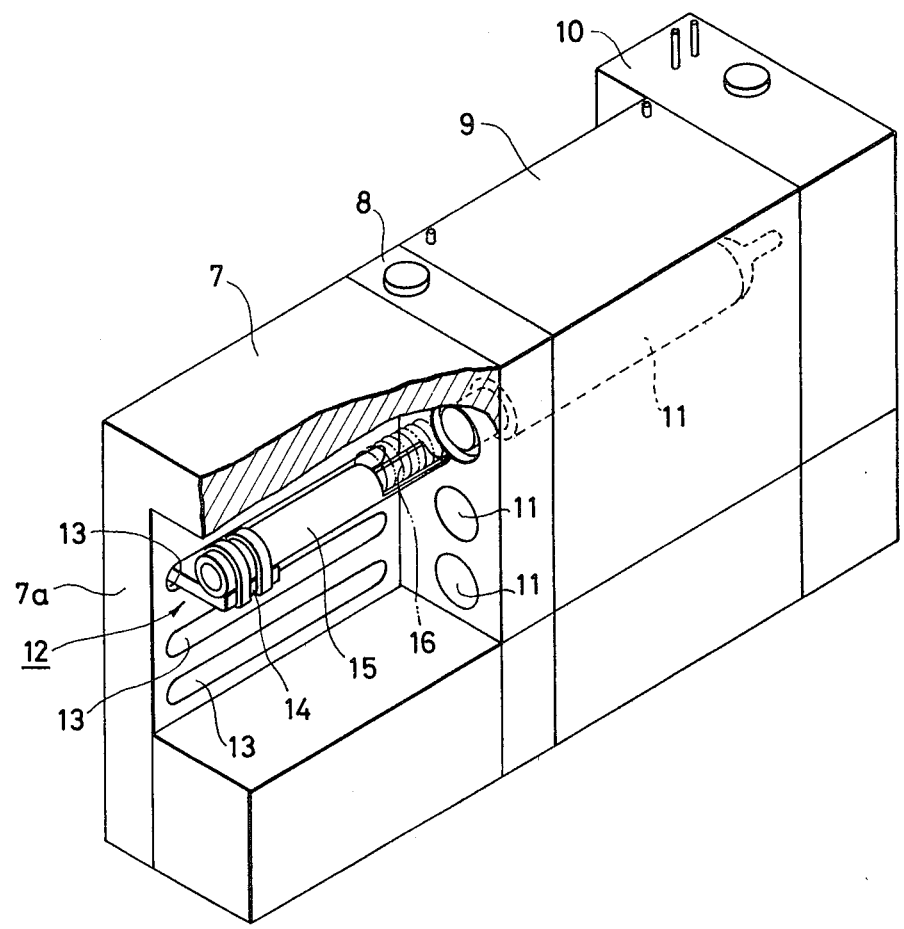
FIG. 3 is a perspective view of another conventional thermal treatment furnace.
Figure 4:
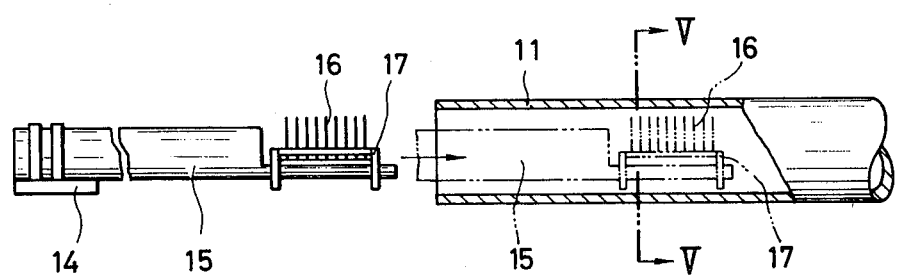
FIG. 4 is a side view of the diffusion furnace shown in FIG. 3.
Figure 5:
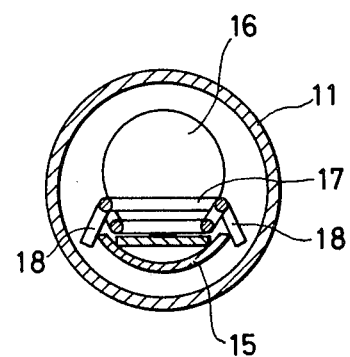
FIG. 5 is a sectional view of the diffusion furnace shown in FIG. 3.
Figure 8:
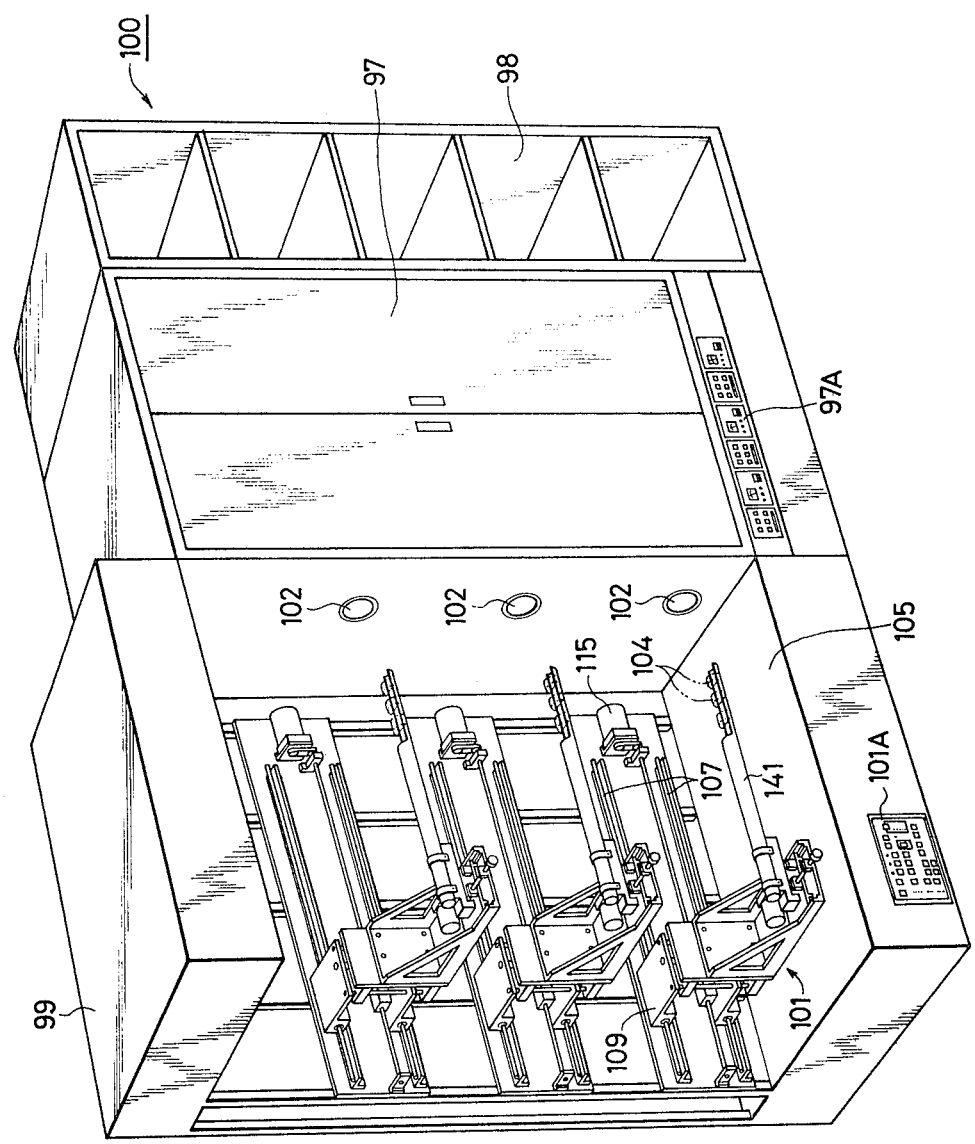
FIG. 8 illustrates the whole of a thermal treatment apparatus according to the present invention.

FIG. 8 is a perspective view of a thermal treatment apparatus 100 according to the present invention. In the figure, a reference numeral 97 designates a thermal treatment furnace which is employed as, e.g., a diffusion furnace for the thermal diffusion treatment for a semiconductor wafer, a thermal oxidation furnace for forming a thermal oxidation film on a semiconductor wafer, a CVD furnace for forming a CVD film on a semiconductor wafer and an annealing furnace for annealing a semiconductor wafer. The thermal treatment furnace has three process tubes 102 disposed in the upper, intermediate and lower stages respectively. Also the thermal treatment furnace 97 has a control panel 97A and the like, which constitute a control system for controlling the thermal treatment furnace, disposed on a side thereof and a doping cabinet 98 disposed in the rear part thereof.

Moreover, a reference numeral 101 denotes a soft landing loader, and three soft landing loaders are disposed in the upper, intermediate and lower stages in correspondence with the three process tubes 102 of the thermal treatment furnace 97. A reference numeral 101A designates a control panel for controlling the soft landing loaders.

The thermal treatment technique according to the present invention will be described hereinunder through a detailed description of one of the soft landing loaders 101.

Figure 9:
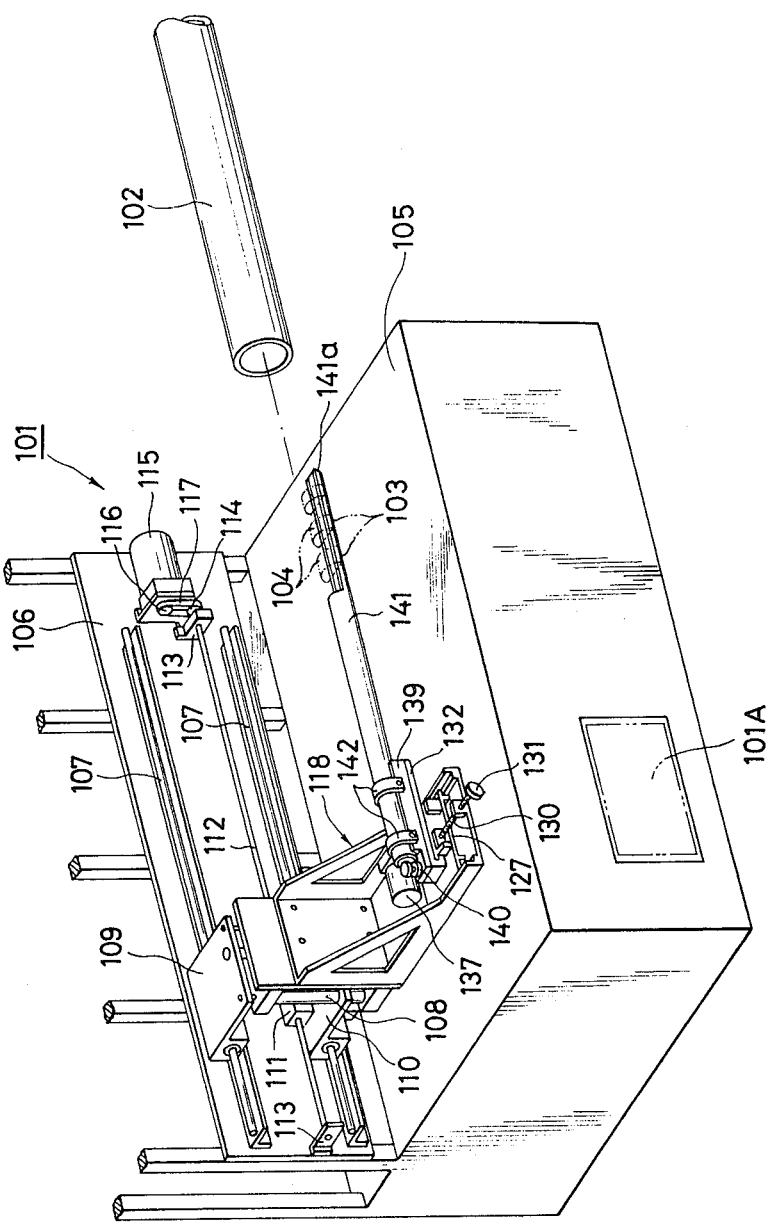
FIG. 9 is a perspective view of a soft landing loader according to the present invention.
Figure 10:
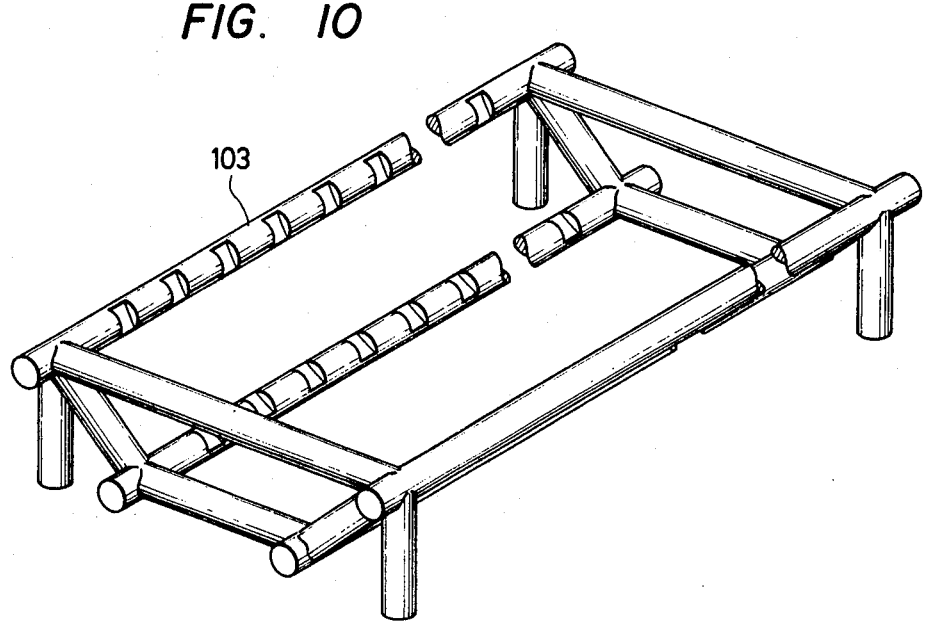
FIG. 10 is a perspective view of a wafer jig.
Figure 11:
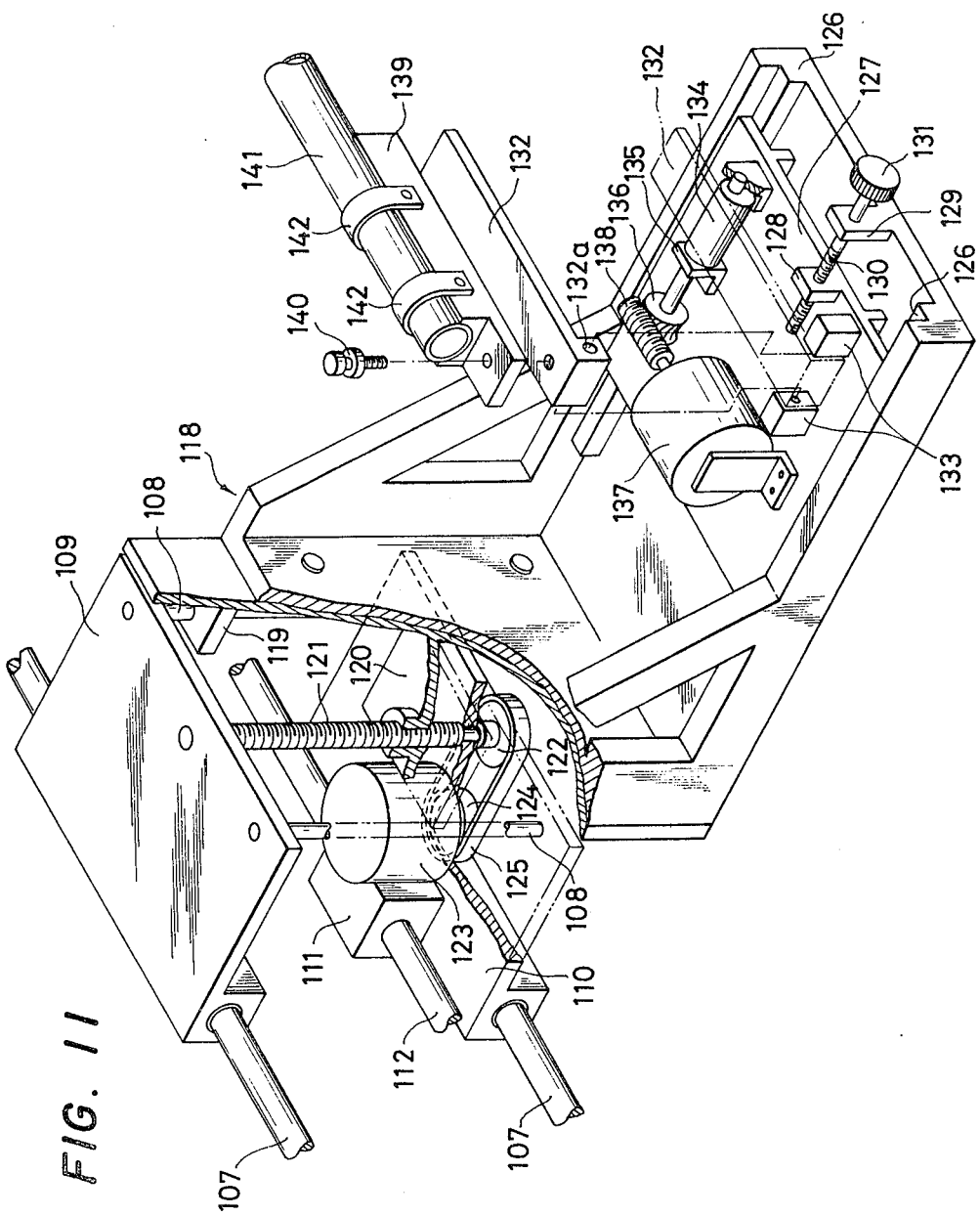

FIG. 9 is a perspective view illustrating, in detail, the soft landing loader 101 in the thermal treatment apparatus 100 according to the present invention. The soft landing loader 101 is disposed adjacently to the opening side of one of the process tubes 102, made of quartz, of the thermal treatment furnace 97, not shown in detail, and adapted to be capable of loading as well as unloading wafers 104, as objects to be treated, mounted aligning on a wafer jig 103 made of quartz, as shown in FIG. 10, together with the wafer jig 103. In other words, the soft landing loader 101 has a base 105 and a rear wall 106 vertically disposed in the rear part of the base. The rear wall 106 has a pair of upper and lower guide rails 107 extended in the axial direction (referred to as "longitudinal direction", hereinafter) of the quartz process tube 102. The guide rails 107 are slidably fitted with upper and lower support plates 109, 110, respectively, integrally connected by means of a pair of guide rods 108 vertically stretched, as shown in FIG. 11. A feed shaft 112 supported by the rear wall 106 so as to be parallel with the guide rails 107 is fitted through a block 111 integrally formed with the lower support plate 110. As shown in FIG. 10, the feed shaft 112 has both ends rotatably supported by bearings 113, 113 respectively as well as a pulley 114, secured to one end thereof, connected to an output pulley 116 of a longitudinal movement motor 115 with a belt 117 so that the feed shaft is driven to revolve on its axis by the motor 115. In addition, the block 111 incorporates a mechanism for axially (longitudinally) moving the block in cooperation with the feed shaft 12. When the feed shaft is revolved on its axis by the mechanism, the block 11, i.e., the upper and lower support plates 109, 110 can be integrally moved in the longitudinal direction according to the direction of the feed shaft revolution on its axis.

A projection 119 of a movable plate 118 formed into a substantial L shape is fitted on each of the guide rods 108 provided between the upper and lower support plates 109, 110 so that the movable plate 118 can vertically move with respect to the support plates 109, 110. Moreover, a block plate 120 projected from a substantially central portion of the rear surface of the movable plate 118 is screwed with a worm rod 121 vertically and rotatably supported between the support plates 109, 110 so that the movable plate 118 can be vertically moved with respect to the support plates 109, 110 by the revolution of the worm rod 121 on its axis. The worm rod 121 has a pulley 122 provided integrally with the lower end thereof, and a belt 125 is stretched between the pulley 122 and a pulley 124 of a motor 123 secured to the support plate 110, thereby allowing the worm rod to revolve on its axis.

On the other hand, a sliding plate 127, capable of moving in the direction (referred to as "lateral direction", hereinafter) perpendicular to the longitudinal direction along steps 126 provided at the front and the rear respectively, is mounted on the horizontal part of the movable plate 118. The sliding plate 127 has a vertical member 128 integrally formed at the left end (in the figure) of the upper surface thereof. The vertical member 128 is screwed with a lateral regulation bolt 130 rotatably supported by a fixed vertical member 129 which is vertically disposed at the left end of the movable plate 118 so as to face to the vertical member 128. The bolt 130 is adapted to laterally move the sliding plate 127, thereby to regulate the position of the sliding plate 127 with respect to the movable plate 118. The bolt 130 has a knob 131 disposed at its end. Manually rotating the knob 131 permits the bolt 130 to revolve on its axis, thereby allowing the sliding plate 127 to laterally move on the movable plate 118.

On the sliding plate 127, a vertically swinging plate 132 adapted to support a fork, described hereinafter in detail, is supported by bearings 133 and a shaft (not shown) at one end 132a thereof. Moreover, an eccentric cam 134 formed into a short rod shape is horizontally disposed at a position corresponding to a substantially central portion of the vertically swinging plate 132 and supported by bearings 135 so that the vertically swinging plate 132 can rotate in the vertical direction. In addition, the eccentric cam has a worm wheel 136 secured to one end thereof. The worm wheel 136 is engaged with a rotating worm 138 of a swing motor 137 secured on the sliding plate 127 so that the eccentric cam 134 can be revolved on its axis by the motor 137.

Figure 12:
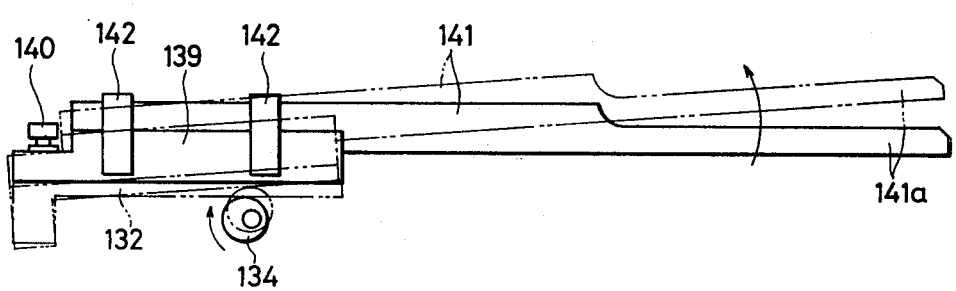

A fork holder 139 having a substantial V-shaped section is secured to the vertically swinging plate 132 by means of a bolt 140, at a portion at one end thereof, and on the holder 139 a fork 141 is substantially horizontally supported by means of two belts 142 in the longitudinal direction. The fork 141 is formed into a pipe shape using quartz material, and a top end 141a thereof is formed by cutting the upper side of the pipe so as to be able to mount a plurality of wafer jigs 103 in a row, as shown in FIG. 9. Accordingly, as shown in FIG. 12, since the central part of the vertically swinging plate 132 is supported by the circumferential surface of the eccentric cam 134, the end 141a of the fork 141, together with the vertically swinging plate 132 and the fork holder 139, can be vertically swung when the eccentric cam 134 is rotated as shown by chain lines of the figure. Moreover, when the bolt 140 is loosened, the fork end 141a can be swung in the horizontally lateral direction with respect to the vertically swinging plate 132.

Figure 13A:
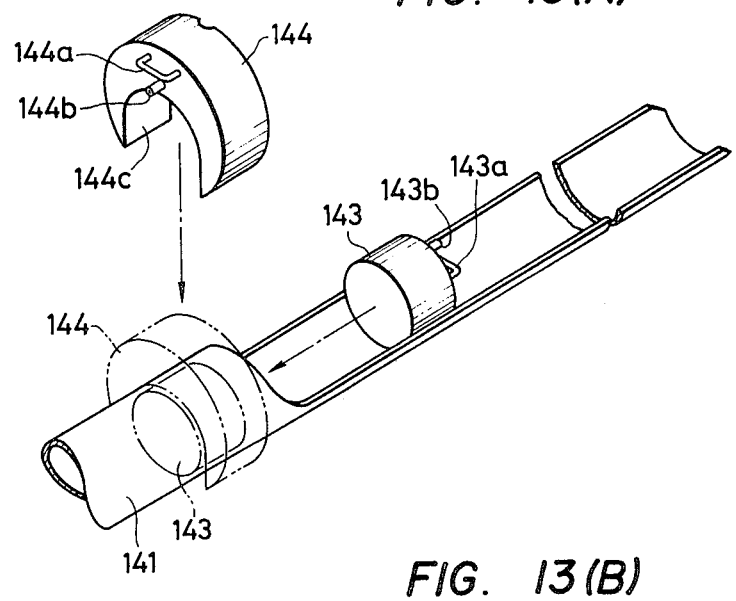
Figure 13B:
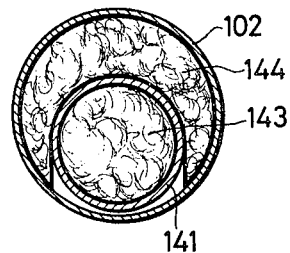
Figure 13C:
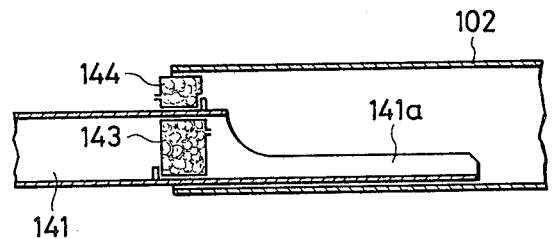

Further, an inner cap 143 and an outer cap 144 can be set inside and outside the substantially central portion of the fork 141 respectively, as shown in FIG. 13(A), FIG. 13(B) and FIG. 13(C) These caps 143, 144 have outer casings made of quartz glass and the insides filled with quartz wool and are provided with handles 143a, 144a and air vents 143b, 144b respectively. The inner cap 143 is formed in a short cylinder shape and can be loaded in the fork 141, while the outer cap 144 is formed into a thick disc shape having a semielliptical notch 144c at a portion thereof and can be mounted on the upper part of the fork. When the fork 141 thus fitted with the inner and outer caps 143, 144 is entered into the process tube 102 made of quartz, as described hereinafter, these caps 143, 144 can close the gap in the vertical sectional direction between the fork 141 and the quartz process tube 102.

The function of the soft landing loader having the above-mentioned arrangement will be described hereinunder.

Figures 14A, 14B, 14C, 14D, 14E, 14F, 14G:
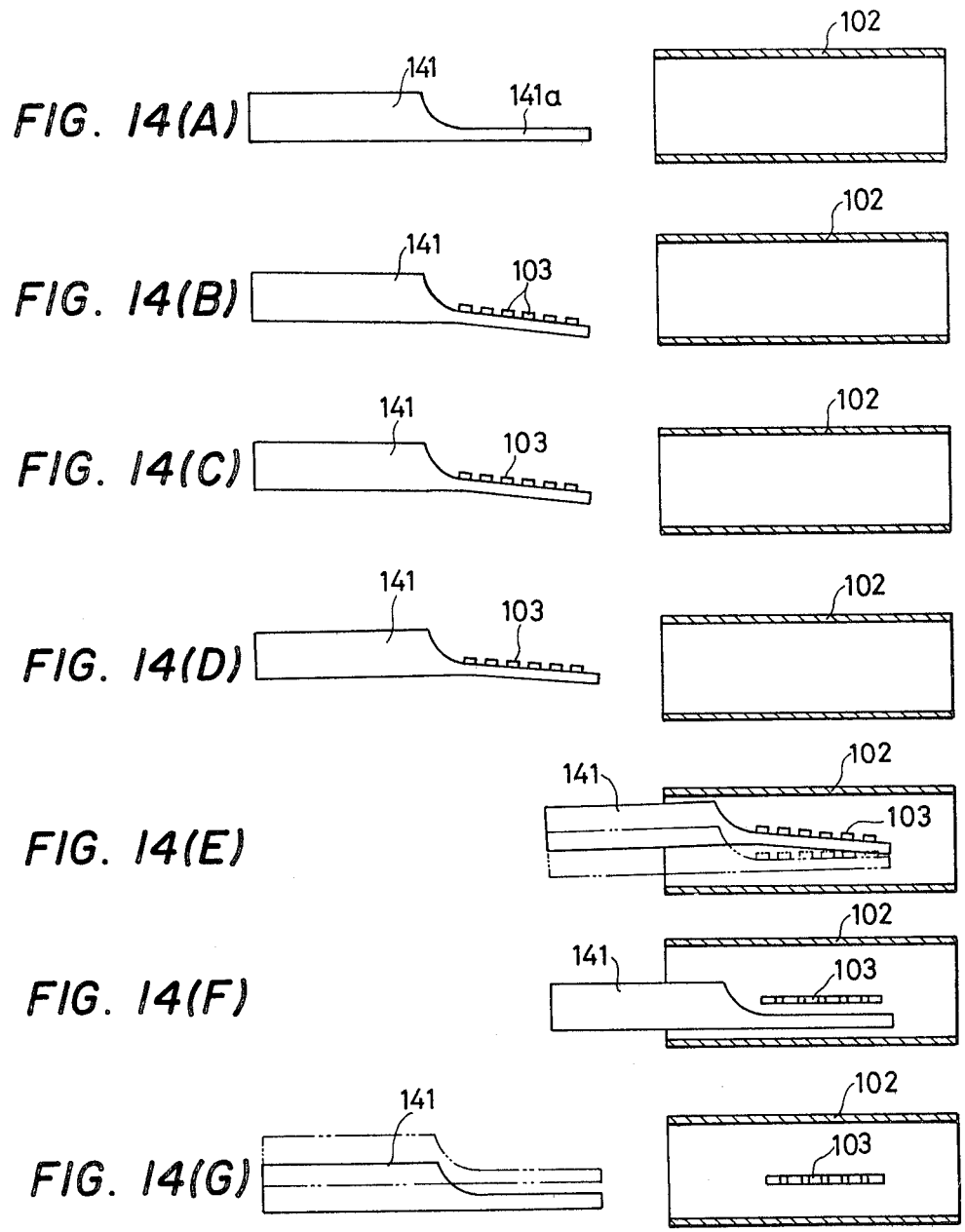
FIG. 14(A) thru FIG. 14(G) illustrate the operation of the thermal treatment apparatus according to the present invention respectively.
Figure 15:
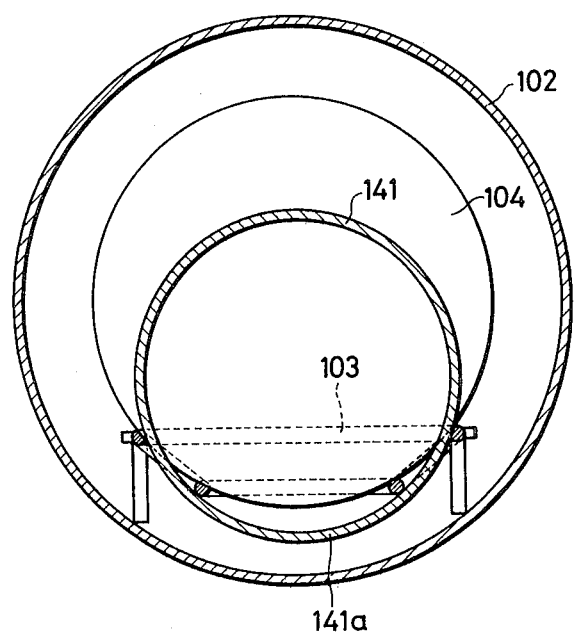
FIG. 15 is a sectional view of a fork according to the present invention, particularly showing the fork being inserted into a process tube.

FIG. 14 illustrates a process for setting the wafer jigs 103 in the quartz process tube 102. On the end 141a of the fork 141 prepared as shown in FIG. 14(A), a plurality of wafer jigs 103 are mounted as shown in FIG. 14(B). In this case, since the fork end is downwardly deformed by the weight of the wafer jigs, the vertical movement motor 123 is driven to rotate the worm rod 121 in order to upwardly move the movable plate 118, thereby to upwardly move the whole of the fork 141 as shown in FIG. 14(C). Moreover, the vertical swing motor 137 is driven to rotate the eccentric cam 134, thereby allowing the fork end 141a to upwardly swing as shown in FIG. 12. Consequently, the posture of the fork end is corrected so as to be substantially horizontal as shown in FIG. 14(D). Then, when the longitudinal movement motor 115 is driven to rotate the feed shaft 112, the block 111 actuates the support plates 109, 110 to advance toward the left of the figure, so that the fork 141 enters into the quartz process tube 102 and stops at a given position as shown by solid lines in FIG. 14(E). Hereupon, reversing the vertical movement motor 123 permits the whole of the fork 141 to move downwardly as shown by chain lines in FIG. 14(E), and the lower ends of the wafer jigs 103 respectively are contacted with the inner bottom surface of the quartz process tube 102 at a given descending position. In this connection, the state at this time is enlarged and shown in FIG. 15. Thereafter, when the vertical movement motor 137 is reversed in order to downwardly swing the fork end 141a, the end is downwardly moved and released from supporting the wafer jigs 103 as shown in FIG. 14(F). Accordingly, when the longitudinal movement motor 115 is then reversed in order to allow the fork 141 to move toward the right of the figure and retreat out of the quartz process tube 102 and at the same time, the vertical movement motor 123 is forward rotated in order to upwardly move the fork 141, it is returned to its initial position as shown by solid lines or dash and two-dotted lines of the FIG. 14(G). According to the process described above, the wafer jigs 103 can be entered into the quartz process tube 102 without contacting with the inside thereof and softly mounted inside the process tube.

Figures 16A, 16B, 16C, 16D, 16E, 16F, 16G:
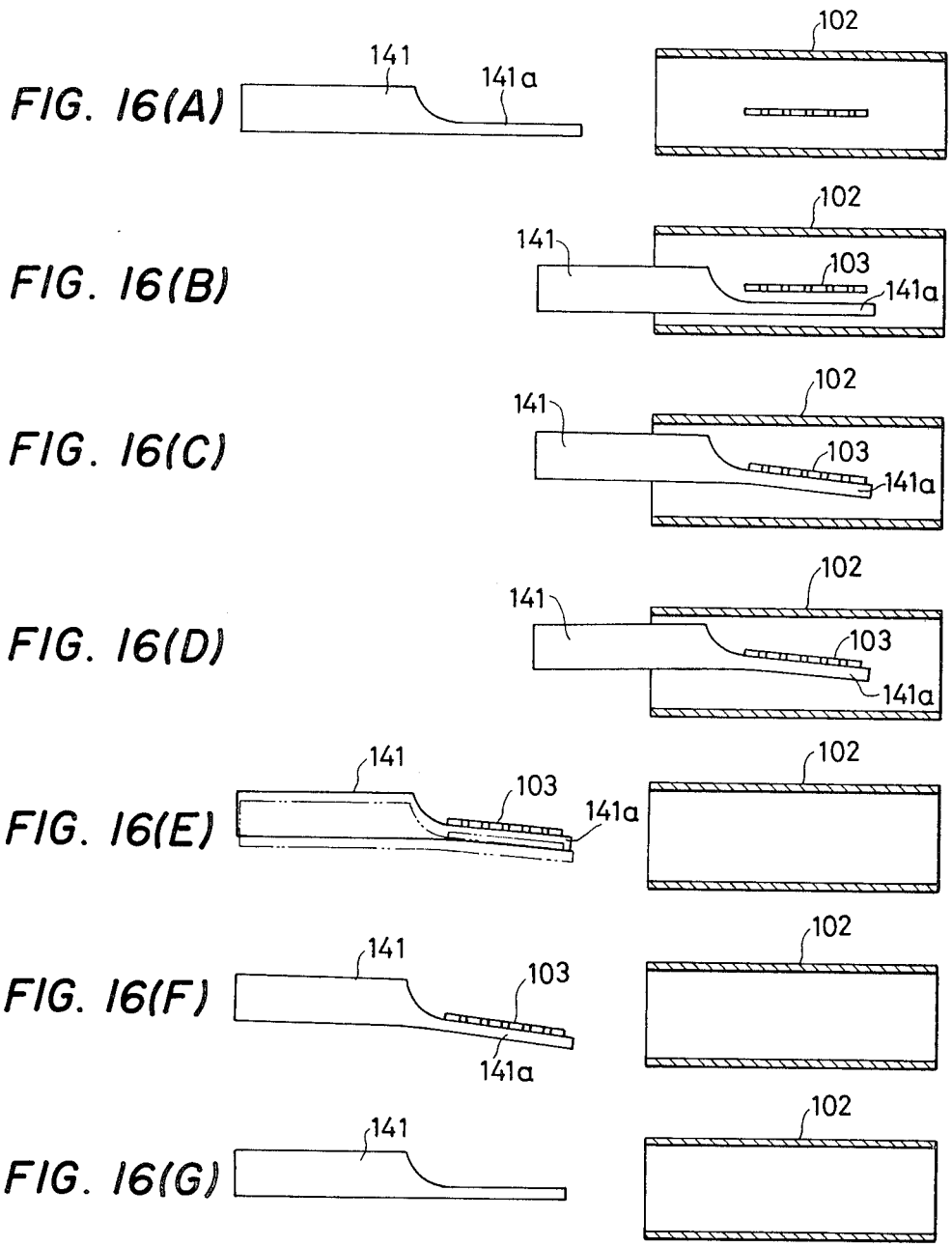
FIG. 16(A) thru FIG. 16(G) illustrate the operation of the thermal treatment apparatus according to the present invention respectively.

On the other hand, FIG. 16 illustrates a process for unloading the wafer jigs of wafers having completed a thermal treatment from the quartz process tube. The fork 141 on standby as shown in FIG. 16(A) is advanced into the quartz process tube 102 by operating the longitudinal movement motor 115, and the fork end 141a is advanced under the wafer jigs 103 as shown in FIG. 16(B). Then, the vertical movement motor 123 is operated in order to vertically move the whole of the fork, thereby allowing the fork end to scoop up the wafer jigs 103 as shown in FIG. 16(C). On doing this, the end 141a is downwardly deformed by the weight of the wafer jigs 103. Therefore, operating the vertical swing motor 137 permits the fork end to be upwardly swung, so that the fork supports the wafer jigs with the end kept substantially horizontal as shown in FIG. 16(D). Thereafter, reversing the longitudinal movement motor 115 permits the fork to retreat out of the quartz process tube 102 as shown by solid lines of FIG. 16(E) and at substantially the same time, the vertical movement motor 123 is driven in order to downwardly move the whole of the fork as shown by chain lines of the figure, and moreover the vertical swing motor 137 is driven in order to downwardly swing the fork end 141a to its initial state as shown in FIG. 16(F). Accordingly, when the operator removes the wafer jigs 103 from the fork under this state, the fork is returned to its initial state as shown in FIG. 16 (G). The wafer jigs 103 are unloaded without contacting with the quartz process tube also in the wafer jig unloading process by the fork.

Therefore, there is no possibility of generation of dust attributable to wear between the wafer jigs 103 and the inner surface of the quartz process tube 102, since the wafer jigs 103 are moved inside the quartz process tube 102 without contacting with the inner surface thereof when the wafer jigs are loaded and unloaded in the above-mentioned processes. Moreover, since the fork 141 can not only move vertically and longitudinally but also swing the end 141a vertically, even when the fork is deformed due to the weight of the wafer jigs, it can support them in a substantially horizontal state, so that falling of the wafer jigs or the like hardly occurs. In this case, there is also such an advantage that even when the fork is downwardly moved, the fork and the quartz process tube will not interfere with each other, because if the fork end is deformed downwardly, this is corrected upwardly.

Figure 17A:
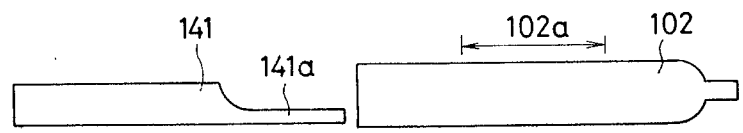
FIG. 17(A) thru FIG. 17(C) illustrate the positions of the fork of the soft landing loader respectively.
Figure 17B:
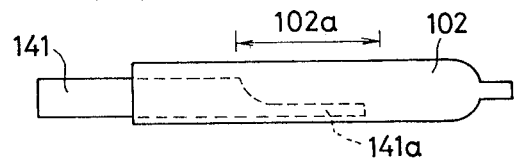
Figure 17C:
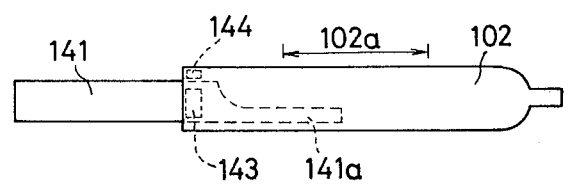

An application example of the soft landing loader according to the preferred embodiment making possible the above-mentioned basic functions will be described hereinunder. First, in this thermal treatment apparatus, the relative position of the fork with respect to the quartz process tube 102 is separated as shown in FIG. 17(A), FIG. 17(B) and FIG. 17(C), and the positions are referred to as $P_1$, $P_2$ and $P_3$: at $P_1$, the fork 141 is completely retreated from the quartz process tube 102; at $P_2$, the fork end 141a is positioned in a soaking part 102a of the quartz process tube 102, namely the wafer jigs are positioned within the soaking part 102a; and at $P_3$, although having been retreated from the soaking part 102a of the quartz process tube 102, the fork end 141a is still within the quartz process tube 102 and at this time, the above-mentioned inner and outer caps 143, 144 are at the opening of the quartz process tube, while closing up the same.

Figure 18:
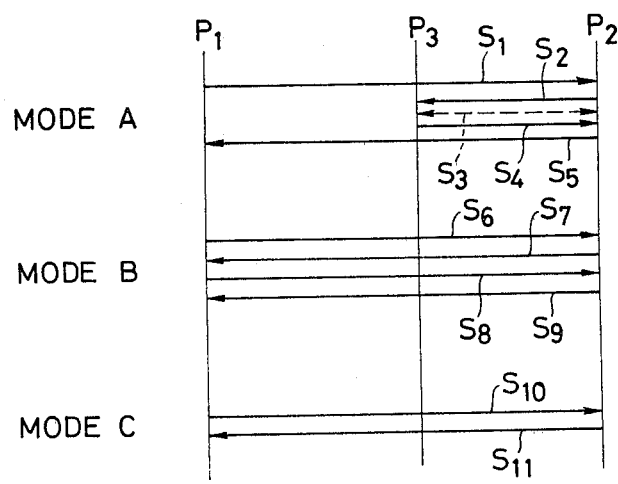
FIG. 18 illustrates the operation of the fork when the soft landing loader is in each of MODE A, MODE B and MODE C.

After these positions, $P_1$, $P_2$ and $P_3$, are set, sequential controls are performed in such modes as shown in FIG. 18(A), FIG. 18(B) and FIG. 18(C), thereby to make it possible to effect controls corresponding to various treatments respectively. Namely, MODE A and MODE B such as shown in FIG. 18 are employed when treatment temperatures are relatively high, e.g., in case of diffusion treatment, thermal oxidation treatment or CVD treatment for wafers. In MODE A, after the fork is moved to $P_2$ in order to set the wafer jigs within the soaking part at a step $S_1$ shown in FIG. 18, the fork is retreated to $P_3$ at a step $S_2$. Here, with the quartz process tube closed up by means of the inner and outer caps, a thermal treatment such as diffusion, thermal oxidation, CVD, annealing or the like is conducted. Since the fork end is near the opening of the quartz process tube at this time, the end is hardly affected by heat. Although in thermal treatments, there are possibilities that the quartz wafer jigs fuse due to the treatment heat and the contact positions (lower ends) thereof with the quartz process tube adhere to the inner surface of the tube, this is prevented by means of a step $S_3$ of the fork operated according to a timer. In other words, according to the operation of an interval timer, the fork advances to $P_2$ from $P_3$ at a proper interval of time, and at $P_2$, the fork end is upwardly swung and positioned there for a short period of time. Thereby, the wafer jigs are being lifted during the period of time, so that they are separated from the inner surface of the quartz process tube, thereby to prevent them from fusing with the inner surface thereof. On completion of the operation, the fork returns to $P_3$ again. Such operation is repeated at proper intervals during the treatment, thereby to make it possible to reliably prevent the fusing of the wafer jigs. After the thermal treatment is completed, the fork end enters under the wafer jigs again at a step $S_4$, and the wafer jigs are unloaded from the quartz process tube at a step $S_5$. Accordingly, even in high-temperature treatments, it is possible to prevent the fusing of the wafer jigs as well as the thermal deformation of the fork, so that excellent thermal treatments can be completed.

In MODE B, as shown by steps $S_6$, $S_7$ illustrated in FIG. 18, after the wafer jigs are entered into the quartz process tube by means of the fork, it is retreated to $P_1$, i.e., the fork is completely drawn out of the quartz process tube, and then a thermal treatment is conducted. On completion of the thermal treatment, the fork is reciprocated again at steps $S_8$, $S_9$, thereby to make it possible to unload the wafer jigs from the quartz process tube. The MODE B is effective for thermal treatments at extremely high temperatures, and it is more effective in case of using an automatic cap for the quartz process tube at the same time.

MODE C is effective for treatments at relatively low temperatures, such as annealing treatment. In the MODE C, at a step $S_{10}$ shown in FIG. 18, the fork is advanced to $P_2$ in order to enter the wafer jig within the soaking part of the quartz process tube, and with this condition maintained, a thermal treatment is conducted. On completion of the thermal treatment, the wafer jigs are unloaded from the quartz process tube according to a step $S_{11}$. Since the treatment temperature is low, needless to say, there are no possibilities of any thermal deformation of the fork.

Figure 19:
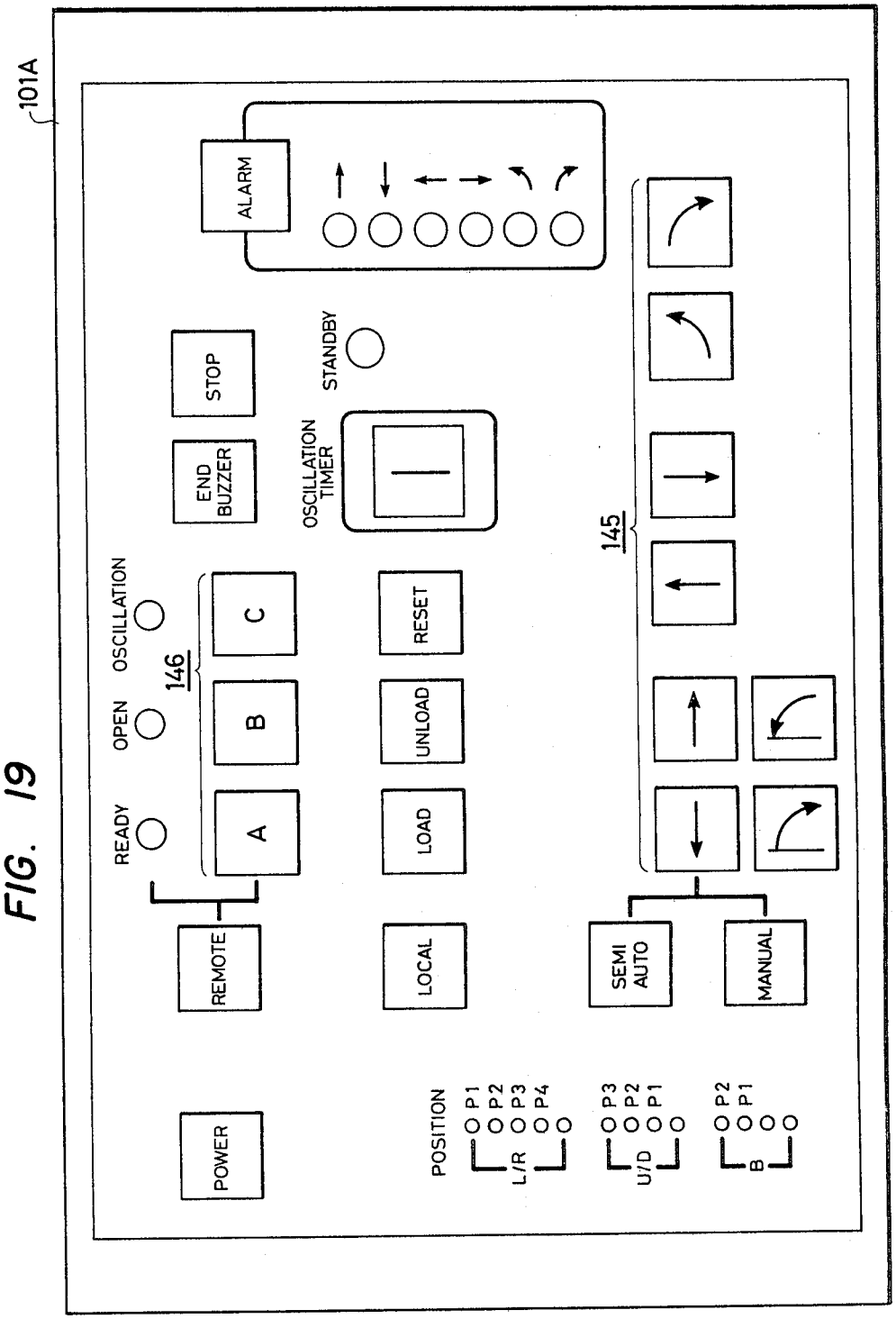
FIG. 19 is a front view of a control panel of the soft landing loader.

It suffices that the above-mentioned MODEs are previously programmed and fed to a microcomputer so that a desired MODE can be obtained by depressing a selection switch. In case of arranging the apparatus so as to be an all-purpose machine, the arrangement is such that the fork can be manually operated, e.g., it suffices to arrange the switch panel of the control panel 101A such as shown in FIG. 19. In such an apparatus, an operation switch group 145 in the lower part of the panel for controlling the operation of the fork can be used in semiautomatic and manual modes. In the manual mode, the fork is operated only while the switch is being depressed, while in the semiautomatic mode, once the switch is depressed the fork is automatically moved and stopped at the subsequent position. In addition, the above-mentioned MODEs, A, B and C, are made available through selection of switches 146 corresponding to A, B and C respectively.

The function of each of switches of the control panel shown in FIG. 19 is as follows.

Depressing POWER SWITCH (SW.) permits all power sources of the soft landing loader to be turned ON. When MANU SW. is turned ON, MANU MODE is obtained, and each of SWs. on the side of the MANU SW. are made effective, so that while each SW. is ON, the operation mode corresponding to the SW. is actuated. When SEMIAUTO SW. is turned ON, each of SWs. on the side thereof are made effective, so that when each SW. is depressed (turned ON), the soft landing loader automatically moves to the subsequent position. When LOCAL SW. is turned ON, the mode is changed into LOCAL MODE. When STOP SW. is turned ON, the motion of the soft landing loader being moved can be temporarily stopped.

Figure 20:
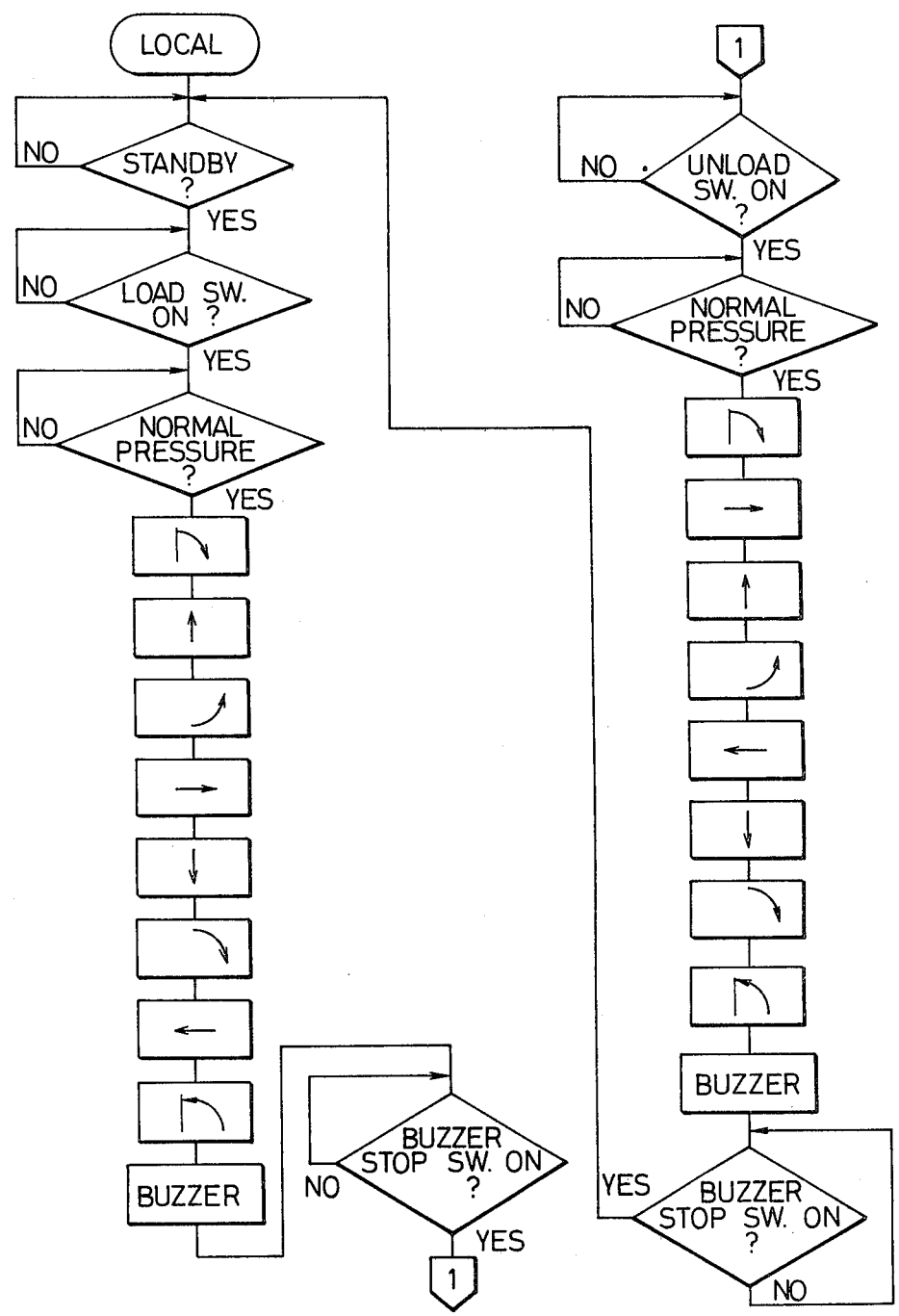
FIG. 20 thru FIG. 23 illustrate sequences of the soft landing loader of the thermal treatment apparatus according to the present invention in the respective MODEs respectively.
Figure 21:
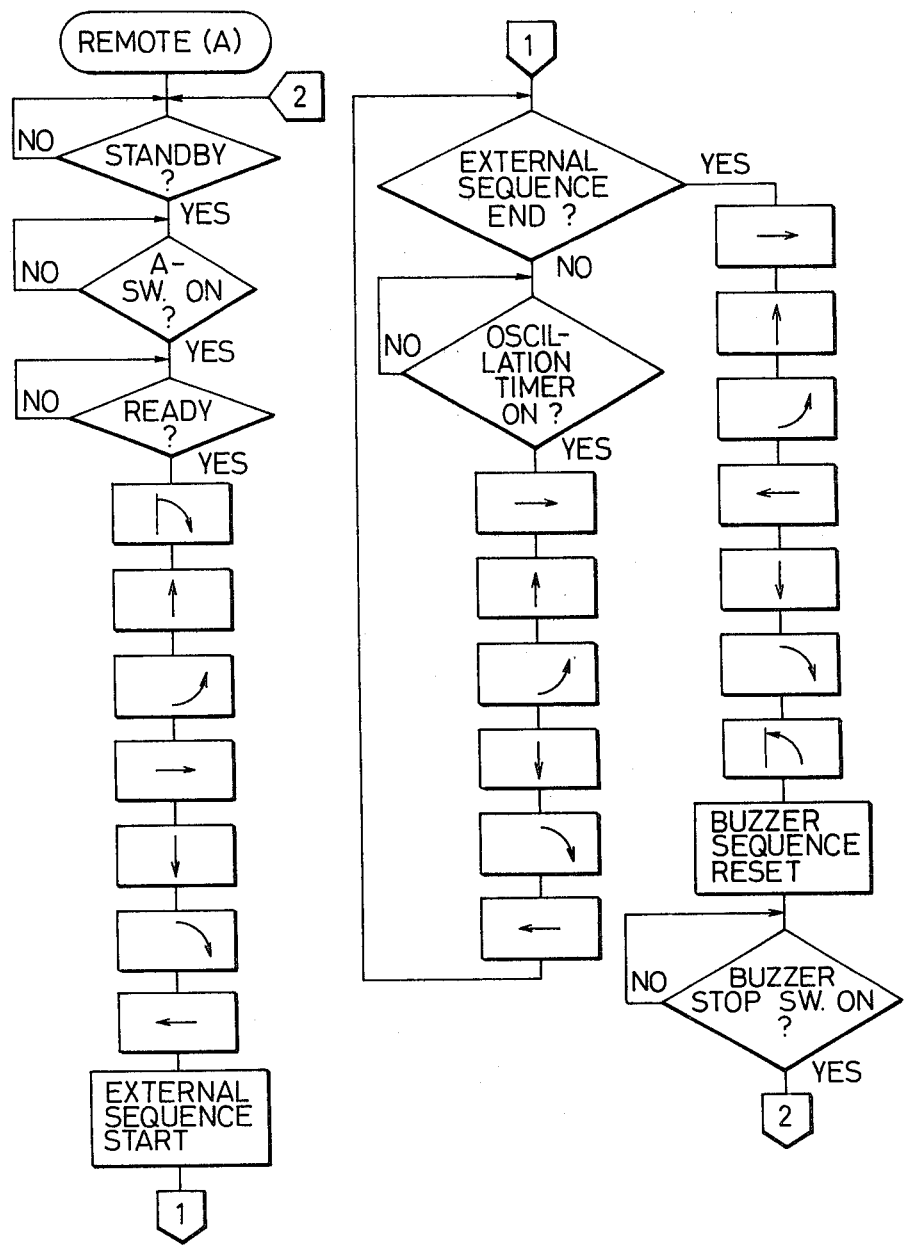
Figure 22:
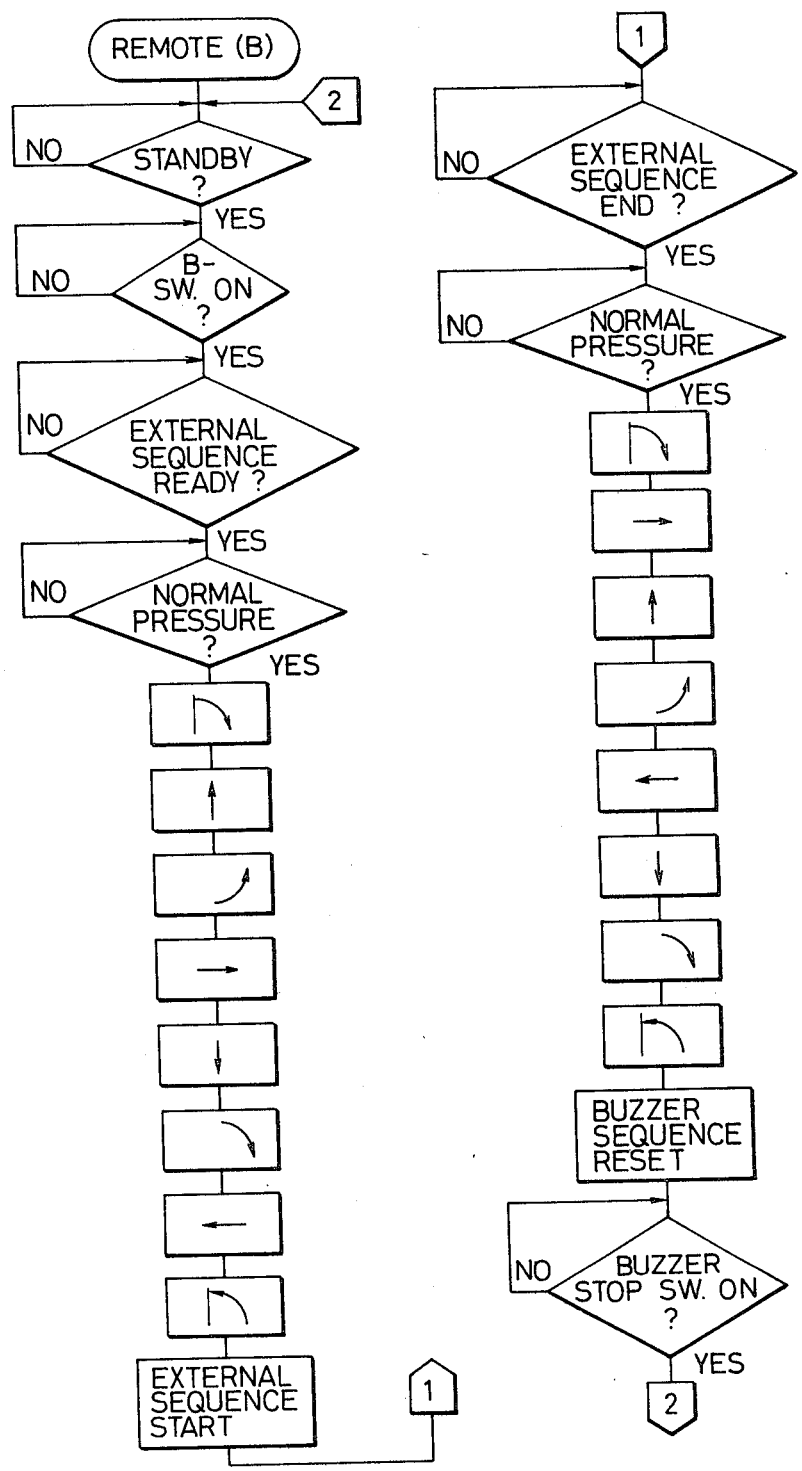
Figure 23:
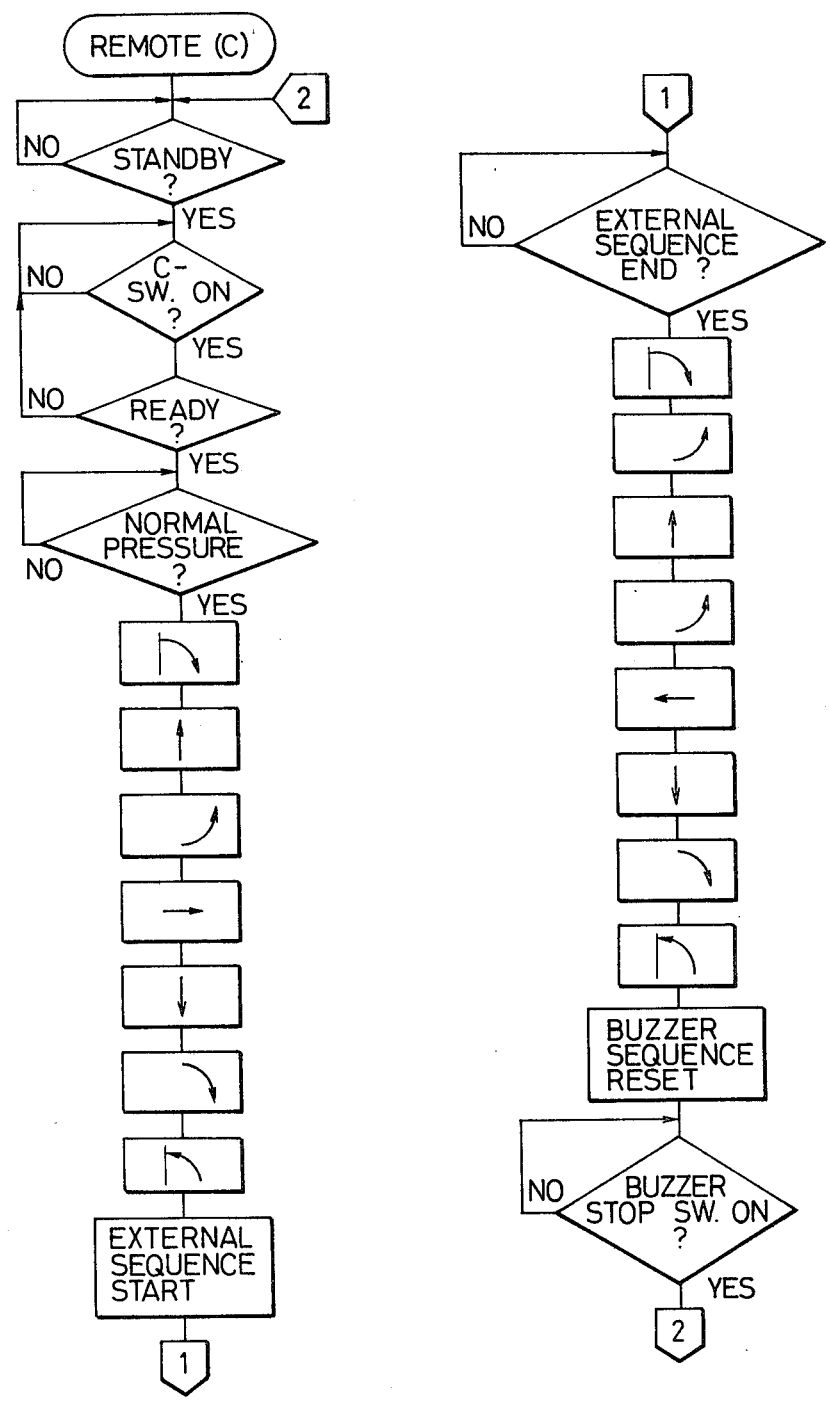

FIG. 20 thru FIG. 23 show the sequences of the soft landing loader respectively: FIG. 20 shows the sequence in LOCAL MODE; FIG. 21 shows the sequence in the MODE A shown in FIG. 18; FIG. 22 shows the sequence in the MODE B shown in FIG. 18; and FIG. 23 shows the sequence in the MODE C shown in FIG. 18.

In FIG. 20 thru FIG. 23, STBY designates "standby", while OSCILLATION(OSC) INTV. denotes an oscillation interval timer.

The present invention is not limited to the above-mentioned preferred embodiment, and the practical devices for moving the fork longitudinally and vertically and for swinging the same vertically respectively can be properly modified in design.

As will be fully understood from the foregoing description, the thermal treatment apparatus according to the present invention can prevent generation of dust by maintaining the inner surface of the process tube and the wafer jigs or the like under a state where they never contact with each other in loading and unloading of the wafer jigs, since the fork capable of transferring the wafer jigs is adapted to be able to move at least vertically and longitudinally with respect to the thermal treatment furnace, and the wafer jigs are made possible to vertically move by vertically swinging the fork end. Moreover, since the wafer jigs can be lifted by intermittently putting in and out the fork during a thermal treatment, it is possible to prevent the fusing of the wafer jigs with the process tube due to heat as well as prevent the thermal deformation of the fork, thereby to make it possible to extremely excellently conduct thermal treatments under high-temperature conditions.

What is claimed is:

1. A thermal treatment apparatus comprising:
   a horizontally extending furnace tube for subjecting wafers to a thermal treatment, said furnace tube having an opening;
   a loader, disposed on the opening side of said furnace tube, for carrying a plurality of wafer jigs in the horizontal direction from outside of said furnace tube to inside of said furnace tube, wherein said loader includes:
   a fork extending in the horizontal direction and having two end portions, with one end portion adapted to have said plural wafer jigs placed thereon;
   first means for supporting the other end portion of said fork and for moving said fork in the horizontal direction;
   said first means having second means for vertically moving said fork with respect to said furnace tube and having third means for adjusting a gradient of said fork with respect to said horizontally extending furnace tube.

2. A thermal treatment apparatus according to claim 1, wherein said third means is positioned adjacent the other end portion of said fork.

3. A thermal treatment apparatus according to claim 1, wherein said third means is a means for causing said one end portion to swing vertically.

4. A thermal treatment apparatus according to claim 1 wherein said furnace tube is made of quartz.

5. A thermal treatment apparatus according to claim 1, wherein said fork is made of quartz and is of a pipe shape.

6. A thermal treatment apparatus according to claim 1, wherein said first means has a moving part adapted to move along a pair of guide rails.

7. A thermal treatment apparatus according to claim 1, wherein said second means and third means have motors, respectively.

8. A thermal treatment apparatus according to claim 5, wherein said fork has an outer cap means and an inner cap means, the outer and inner cap means being adapted to cooperatively act to seal off the opening of the furnace tube, said outer cap means and inner cap means being made from quartz.

9. A thermal treatment apparatus comprising:
   a horizontally extending furnace tube for subjecting wafers to thermal treatment, said furnace tube having an opening;
   a carrier extending in horizontal direction and having a portion adapted to have a plurality of wafer jigs placed thereon;
   moving means for moving said carrier from a first position outside the furnace tube to a second position inside the furnace tube and from the second position inside the furnace tube to the first position outside the furnace tube;
   control means, coupled to said moving means, for controlling movement of said carrier between said first and said second positions in accordance with predetermined several modes.

10. A thermal treatment apparatus according to claim 9, wherein one of said several modes is defined in such a manner that said carrier is located inside of said furnace tube during thermal treatment, while another of said several modes is defined in such a manner that said carrier is located outside of said furnace tube during thermal treatment.

11. A thermal treatment apparatus according to claim 9, wherein said predetermined several modes include different thermal treatments of the wafer.

12. A thermal treatment apparatus according to claim 11, wherein said different thermal treatments include treatments at different temperatures.

13. A thermal treatment apparatus according to claim 9, wherein said predetermined several modes includes one in which said carrier is intermittently passed into the furnace tube during the thermal treatment to lift the wafer jigs during said thermal treatment, whereby fusing of the wafer jigs during the thermal treatment can be prevented.

* * * * *